(12) United States Patent
Kim

(10) Patent No.: US 7,182,073 B1
(45) Date of Patent: Feb. 27, 2007

(54) LPI ENGINE SYSTEM

(75) Inventor: Deok-Ryol Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/299,380

(22) Filed: Dec. 8, 2005

(51) Int. Cl.
*F02B 44/00* (2006.01)
*G06F 7/00* (2006.01)

(52) U.S. Cl. ...................... 123/527; 701/104
(58) Field of Classification Search ........... 123/27 GE, 123/527; 701/104
See application file for complete search history.

(56) References Cited

U.S. PATENT DOCUMENTS

| | | | |
|---|---|---|---|
| 5,383,287 A | 1/1995 | Kuhasalo | |
| 5,752,659 A | 5/1998 | Moncelle | |
| 2004/0111210 A1* | 6/2004 | Davis et al. | 701/103 |

FOREIGN PATENT DOCUMENTS

| | | |
|---|---|---|
| JP | 56-081232 | 7/1981 |
| JP | 56-159525 | 12/1981 |
| JP | 60-065261 | 4/1985 |
| JP | 62-199957 | 9/1987 |
| JP | 04-119282 | 4/1992 |
| JP | 06-081691 | 3/1994 |
| JP | 2003-206774 | 7/2003 |

* cited by examiner

*Primary Examiner*—Noah P. Kamen
(74) *Attorney, Agent, or Firm*—Morgan Lewis & Bockius LLP

(57) ABSTRACT

Disclosed herein is an LPI engine system. The LPI engine system of the present invention directly injects LPG fuel under high pressure into an intake system of an engine through an injector and precisely controls the injection rate of LPG fuel through the control of the injector, thus improving the fuel consumption ratio and power performance of a vehicle, enhancing the startability of the vehicle in the winter, and making maintenance addressing the buildup of tar after combustion unnecessary. Furthermore, in the LPI engine system of the present invention, the injector, which adjusts the injection rate of LPG fuel into the intake system of the engine, includes a path shutoff part which functions to controls an LPG fuel injection path depending on an operational state of the engine, thus preventing LPG fuel from leaking into the intake system of the engine through the injector when the engine is in an ignition OFF state.

7 Claims, 3 Drawing Sheets

LPI ENGINE SYSTEM

CROSS-REFERENCE TO RELATED APPLICATIONS

The present application is based on, and claims priority from, Korean Application Serial Number 10-2005-0080177, filed on Aug. 30, 2005, the disclosure of which is hereby incorporated by reference herein in its entirety.

FIELD OF THE INVENTION

The present invention relates to LPI (liquefied petroleum gas injection) engine systems and, more particularly, to an LPI engine system which directly injects LPG (liquefied petroleum gas) fuel under high pressure into an intake system of an engine through an injector.

BACKGROUND OF THE INVENTION

Generally, LPG engine systems are constructed such that LPG fuel, which has been stored in a fuel tank, is supplied into an engine after being evaporated by a mixer and a vaporizer. However, in such a conventional LPG engine system, because it is difficult for an ECU (electronic control unit) to precisely control the injection rate of fuel, the startability of the engine is reduced in the winter, and the power performance and fuel consumption ratio of the engine are decreased. As well, due to a problem of creation of tar when LPG fuel is burned, the engine is unstable when idling, and frequent engine stalling occurs.

To solve the above-mentioned problems, LPI engine systems, which directly inject LPG fuel under high pressure and in a liquefied state through an injector without having a mixer or a vaporizer, have been developed.

In this LPI engine system, because LPG fuel is directly injected through an injector and an ECU is able to precisely control the injector, the fuel consumption ratio, the power performance and the statability of the engine are improved, and vehicle maintenance to address the buildup of tar is not required.

However, the conventional LPI engine system is problematic in that, when the engine is in an ignition OFF state during a starting operation, pressure in a fuel system increases excessively due to the increased temperature of the fuel system, so that LPG fuel leaks into an intake system of the engine through the injector.

This problem is caused by the expansion in volume of LPG fuel due to the evaporation of LPG fuel, which has been in the liquid phase under high pressure, resulting from increased temperature of the fuel system when in the ignition OFF state. That is, when the vehicle travels, the LPG fuel under high pressure is maintained in the liquefied state by natural cooling by outside air, but, when the engine enters the ignition OFF state when the vehicle is stopped, natural cooling of the fuel system by outside air cannot be performed, so that the fuel system is heated through thermal transfer by high-temperature conditions in the engine compartment.

As such, if LPG fuel leaks into the intake system of the engine during the ignition OFF state, when the engine is subsequently started, because LPG fuel, which is normally injected through the injector under the control of the ECU, is mixed with and burned along with the LPG fuel which has remained in the intake system after having leaked, there is a problem in that exhaust gas contains an excessive amount of hydrocarbon.

SUMMARY OF THE INVENTION

Embodiments of the present invention provides an LPI engine system which directly injects LPG fuel under high pressure into an intake system of an engine through an injector and is able to precisely control the injection rate of LPG fuel through the control of the injector, thus improving the fuel consumption ratio and the power performance of a vehicle, enhancing the startability of the vehicle in the winter, and making vehicle maintenance to address tar buildup after combustion unnecessary.

The embodiments of the present invention provides an LPI engine system in which the injector, which adjusts the injection rate of LPG fuel injected into the intake system of the engine, includes a path shutoff part which functions to control an LPG fuel injection path depending on a startup state of the engine, thus preventing LPG fuel from leaking into the intake system of the engine through the injector when the engine is in an ignition OFF state.

An LPI engine system according to an embodiment of the present invention includes an injector which is provided in an intake system of an engine to inject LPG fuel. A fuel tank stores the LPG fuel therein to supply the LPG fuel to the injector. A supply line and a recovery line are connected between the injector and the fuel tank, so that the LPG fuel is supplied and recovered through the supply line and the recovery line. An EMS ECU (engine management system electronic control unit) controls injection time and injection rate of the LPG fuel to be injected through the injector, depending on traveling conditions. An LPI ECU (liquefied petroleum gas injection electronic control unit) detects variation in temperature and pressure of the LPG fuel in a fuel supply and recovery system defined between the fuel tank and the injector and controls the fuel supply and recovery system such that supply of the LPG fuel is limited during an emergency state,

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

Figure 1:
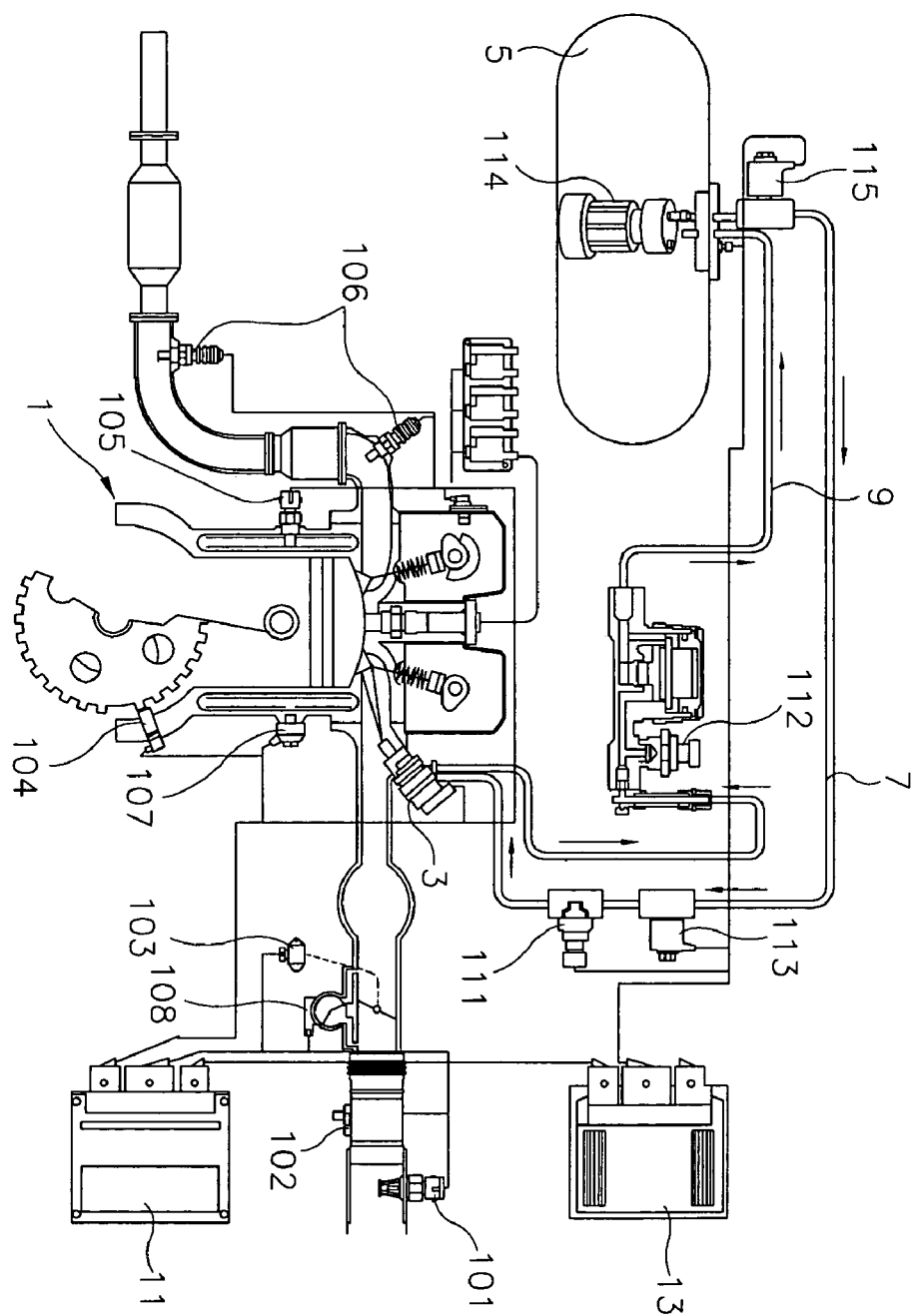
FIG. 1 is a view showing the structure of an LPI engine system, according to a preferred embodiment of the present invention.

As shown in FIG. 1, an LPI (liquefied petroleum gas injection) engine system according to the preferred embodiment of the present invention includes an injector 3 which is provided in an intake system of an engine 1 to inject LPG (liquefied petroleum gas) fuel, and a fuel tank 5 which stores therein LPG fuel under high pressure to supply the LPG fuel to the injector 3. The LPI engine system further includes a supply line 7 and a recovery line 9 which are connected between the injector 3 and the fuel tank 5 so that LPG fuel is supplied and recovered through the supply line 7 and the recovery line 9. The LPI engine system further includes an EMS ECU (engine management system electronic control unit) 11 which appropriately controls the injection time and injection rate of LPG fuel injected through the injector 3, depending on traveling conditions, and an LPI ECU (liquefied petroleum gas injection electronic control unit) 13 which detects variation in physical properties of a fuel supply and recovery system defined between the fuel tank 5 and the injector 3 and controls the operation of the fuel supply and recovery system.

The EMS ECU 11 is connected to an ATS (air temperature sensor) 101, a MAF (mass air flow) sensor 102, a TPS (throttle position sensor) 103, a CPS (crank position sensor) 104, a WTS (water temperature sensor) 105, an oxygen sensor 106 and a knock sensor 107. The EMS ECU 11 receives information about a variety of physical properties, which vary during the operation of the engine, from the above-mentioned sensors. Furthermore, the EMS ECU 11 controls an idle speed actuator 108 which is provided in the intake system, thus adjusting the intake rate of air when idling.

The LPI ECU 13 is connected both to a fuel temperature sensor 111 which is provided on the supply line 7, and to a fuel pressure sensor 112 which is provided on the recovery line 9, so that the LPI ECU 13 receives information about temperature and pressure of LPG fuel detected by the fuel temperature sensor 111 and the fuel pressure sensor 112.

Furthermore, a first shutoff valve 113, which controls opening and shutting of a supply path of the fuel, is provided on the supply line 7. A fuel pump module 114 for the discharge of LPG fuel is provided in the fuel tank 5. A second shutoff valve 115, which limits discharge of the LPG fuel from the fuel tank 5, is provided on the fuel tank 5. The first and second shutoff valves 113 and 115 and the fuel pump module 114 are operated under the control of the LPI ECU 13.

Meanwhile, the EMS ECU 11 and the LPI ECU 13 are connected to each other through a CAN (controller area network) communication to share various information.

Figure 2:
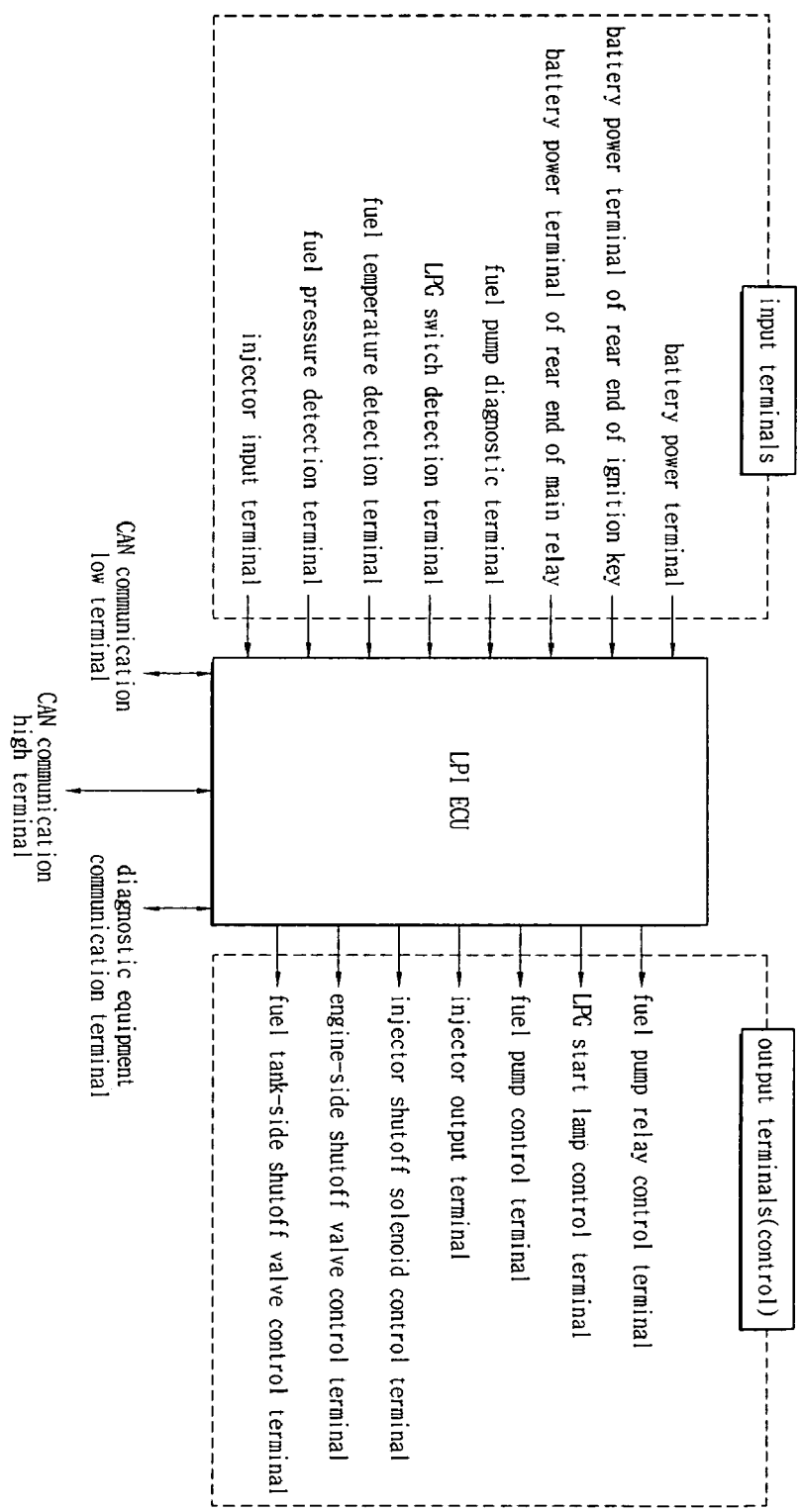
FIG. 2 is a block diagram showing input and output systems of an LPI electronic control unit of the LPI engine system of FIG. 1.

As shown in FIG. 2, the LPI ECU 13 sets a battery power terminal, a battery power terminal of a rear end of an ignition key, a battery power terminal of a rear end of a main relay, a fuel pump diagnostic terminal, an LPG switch detection terminal, a fuel temperature detection terminal, a fuel pressure detection terminal and an injector input terminal as input terminals.

Furthermore, the LPI ECU 13 sets a fuel pump relay control terminal, an LPG start lamp control terminal, a fuel pump control terminal, an injector output terminal, an injector shutoff solenoid control terminal, an engine-side shutoff valve control terminal and a fuel tank-side shutoff valve control terminal as output terminals.

The LPI ECU 13 is connected to the EMS ECU 11 through CAN communication high/low terminals and is connected to diagnostic equipment, such as a hi-scan for vehicle maintenance, through separate input/output communication terminals.

Figure 3:
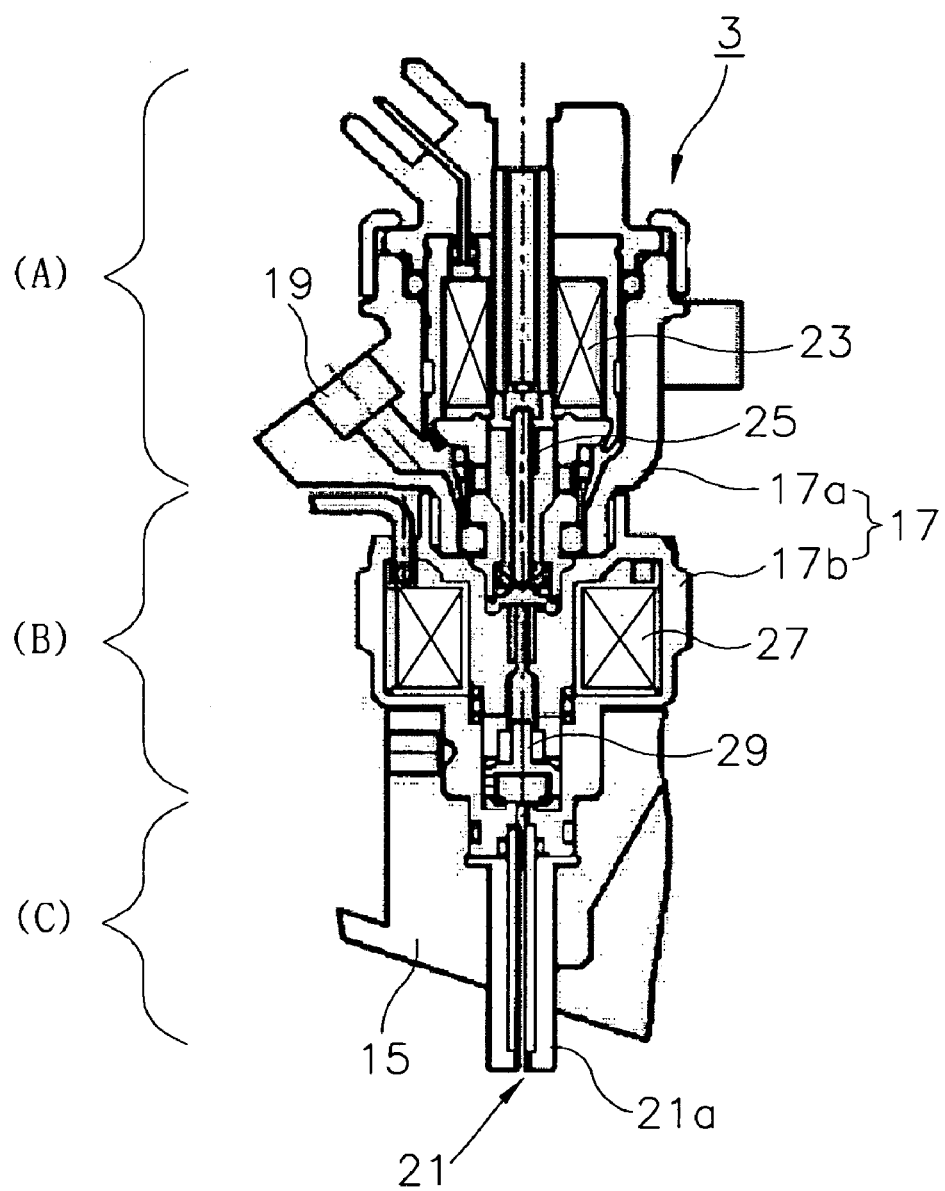
FIG. 3 is a sectional view showing an injector of the LPI engine system of FIG. 1.

Meanwhile, as shown in FIG. 3, the injector 3 includes an injection control part (A) which controls the injection time and injection rate of LPG fuel to be injected into the intake system of the engine 1 under the control of the EMS ECU 11, and a path shutoff part (B) which functions to control opening and shutting of an LPG fuel injection path, defined between the injector 3 and the intake system of the engine 1, depending on the operational state of the engine 1. The injector 3 further includes a mounting part (C) through which the injector 3 is mounted to the intake system. The injection control part (A), the path shutoff part (B) and the mounting part (C) are integrated with each other.

For the above-mentioned structure, the injector 3 comprises a main boy 17 which is mounted to an intake manifold 15, that is, the intake system of the engine 1, a passage 19 which is defined at a predetermined position in the main body 17 such that the passage 19 communicates with the supply line 7, and a nozzle 21 which is mounted to a lower end of the main body 17 to inject LPG fuel into the intake manifold 15.

In this case, the injection control part (A) of the injector 3 includes a first coil 23 which is provided at an upper position in the main body 17 and is magnetized by the control of the EMS ECU 11, and a first plunger 25 which is moved by the magnetization of the first coil 23 and thus controls an LPG fuel flow path defined in the injector 3.

Furthermore, the path shutoff part (B) of the injector 3 includes a second coil 27 which is provided at a lower position in the main body 17 and is magnetized by the control of the EMS ECU 11 which detects whether the engine 1 is in an ignition ON state or in an ignition OFF state, and a second plunger 29 which is moved by the magnetization of the second coil 27 and thus controls an LPG fuel injection path defined through the nozzle 21.

The nozzle 21 has an outer casing 21a which is made of metal such as brass having high heat conductivity such that heat transfer in the intake manifold 15 is superior. This prevents fuel injection ability from deteriorating due to freezing of moisture around the nozzle 21 that occurs due to latent heat of evaporation after LPG fuel is injected through the nozzle 21.

The main body 17 of the injector 3 is divided into an upper body 17a and a lower body 17b based on the first plunger 25 for ease of installation of the injection control part (A) and path shutoff part (B). Of course, the upper body 17a and the lower body 17b, which have been separated from each other, are securely coupled to each other after the injection control part (A) and path shutoff part (B) are installed in the upper body 17a and the lower body 17b.

The operation of the LPI engine system of the present invention will be described in detail herein below.

First, the EMS ECU 11 receives various properties, such as an intake air temperature, an intake rate of air, a throttle opening ratio, a crank position, the amount of oxygen, knocking, etc., which vary during the operation of the engine 1, from the ATS 101, the MAF sensor 102, the TPS 103, the CPS 104, the WTS 105, the oxygen sensor 106 and the knock sensor 107. When idling, the EMS ECU 11 controls the idle speed actuator 108 which is provided in the intake system, thus adjusting the amount of air drawn into the combustion chamber of the engine 1.

The LPI ECU 13, which is connected both to the fuel temperature sensor 111 provided on the supply line 7 and to the fuel pressure sensor 112 provided on the recovery line 9, receives information about temperature and pressure of LPG fuel detected by the fuel temperature sensor 111 and the fuel pressure sensor 112.

Furthermore, the LPI ECU 13 controls the first shutoff valve 113 provided on the supply line 7 and the second shutoff valve 115 provided on the fuel tank 5, thus controlling the supply of fuel through the fuel supply path.

For this, as shown in FIG. 2, at the input/output terminals of the LPI ECU 13, various types of information about the vehicle when traveling are input/output through input/output paths.

The battery power terminal directly receives power of the battery from the EMS ECU 11 and thus allows the LPI ECT 13 to confirm the state of the power. The battery power terminal of the rear end of the ignition key allows the LPI ECU 13 to determine whether the ignition key of the vehicle is in the ON position or in the OFF position. The battery power terminal of the rear end of the main relay allows the LPI ECU 13 to use the stable power of the rear end of the main relay as a main power supply. The fuel pump diagnostic terminal allows the LPI ECU 13 to determine whether there is a malfunction of the fuel pump using information gained by self-diagnosis implemented in the fuel pump. If there is a malfunction, the fuel pump diagnostic terminal causes the LPI ECU13 to record it as a diagnostic trouble code. The LPG switch detection terminal allows the LPI ECU13 to detect a switching signal, generated when a driver manipulates an LPG switch, provided in the passenger compartment of the vehicle, to interrupt the supply of LPG fuel to meet safety regulations in emergency conditions, and thus to limit the operation of the first and second shutoff valves 113 and 115 and the fuel pump module 114 through the signal. The fuel temperature detection terminal allows the LPI ECU 13 to determine the temperature of fuel using a signal resulting from detection of the fuel temperature sensor 111 and to apply the information to the fuel control. The fuel pressure detection terminal allows the LPI ECU 13 to determine the pressure of fuel using a signal detected by the fuel pressure sensor 112 and to apply the information to the fuel control. The injector input terminal makes it possible for the LPI ECU 13 to determine the current traveling state of the vehicle from vehicle information detected by the EMS ECU 11 using the various sensors and to output a control signal such that the injection time and injection rate of LPG fuel are appropriately adjusted.

When the LPI ECU 13 detects an ignition ON event, the LPI ECU 13 outputs an On signal to a relay for operating the fuel pump module through the fuel pump relay control terminal. When the LPI ECU 13 determines that conditions allowing the engine to be started are satisfied using the temperature and pressure of the fuel detected after the ignition ON event, the LPI ECU 13 outputs a signal to turn off a start lamp through the LPG start lamp control terminal. The fuel pump control terminal allows the LPI ECU 13 to control the fuel pump in multiple stages such that an appropriate amount of fuel is supplied into the engine depending on the condition of the engine. The injector output terminal allows the LPI ECU 13 to control the operation of the injector 3 using the injector input signal transmitted from the EMS ECU 11. The injector shutoff solenoid control terminal allows the LPI ECU 13 to control the injector shutoff solenoid such that, when the ignition ON event occurs, the path shutoff part (B) of the injector 3 is shut off, and when the ignition OFF event occurs, the path shutoff part (B) of the injector becomes opened, thus preventing LPG fuel from undesirably leaking from the injector 3. When the ignition ON event occurs, the engine-side shutoff valve control terminal and the fuel tank-side shutoff valve control terminal allow the LPI ECU 13 to open the shutoff valves for the supply of fuel. When the ignition OFF event occurs, they allow the LPI ECU 13 to close the shutoff valves. Furthermore, when the LPG switch is turned off under emergency conditions, they allow the LPI ECU 13 to close the shutoff valves to interrupt the supply of fuel.

The LPI ECU 13 has the high/low communication terminals, so that the LPI ECU 13 performs CAN communication with the EMS ECU 11 through the high/low communication terminals. The LPI ECU 13 has the input/output communication terminals which are separately provided from the high/low communication terminals, so that the LPI ECU 13 communicates with the diagnostic equipment, such as a hi-scan for vehicle maintenance, through the input/output communication terminals.

Meanwhile, the injector 3 includes the injection control part (A) which controls the injection time and injection rate of LPG fuel to be injected into the intake system of the engine 1, and the path shutoff part (B) which functions to control the opening and shutting of the LPG fuel injection path, defined between the injector 3 and the intake system of the engine 1, depending on the operational state of the engine 1. The injection control part (A) controls the injection time and injection rate of LPG fuel, injected into the intake manifold 15 through the nozzle 21, using the first plunger 25 which is moved by the first coil 23 magnetized under the control of the EMS ECU 11.

Furthermore, the path shutoff part (B) detects the ignition state of the engine 1, so that, when the engine 1 is in the ignition ON state, the path shutoff part (B) opens the flow path of LPG fuel, defined so as to lead to the nozzle 21 in the main body 17, using the second plunger 29 which is moved by the second coil 27 magnetized under the control of the EMS ECU 11. When the engine 1 enters the ignition OFF state, the path shutoff part (B) is closed, thus fundamentally preventing LPG fuel from leaking into the intake system of the engine 1 through the injector 3 due to increased pressure caused by increased temperature of the fuel system when the ignition is off.

As well, the outer casing 21a of the nozzle 21 of the injector 3 is made of metal such as brass having high heat conductivity, thus preventing moisture from freezing around the nozzle 21 due to latent heat of evaporation after LPG fuel is injected through the nozzle 21. As a result, fuel injection ability of the injector 3 is prevented from being deteriorated due to freezing of moisture around the nozzle 21.

As is apparent from the foregoing, an LPI engine system according to the present invention directly injects LPG fuel under high pressure and in a liquefied state into an intake system of an engine through an injector and is able to precisely control an injection rate of LPG fuel through the control of the injector, thus improving the fuel consumption ratio and the power performance of a vehicle, and enhancing the startability of the vehicle in the winter. In addition, the present invention does not require maintenance to address the buildup of tar after combustion.

Furthermore, the present invention controls the injector which adjusts the injection rate of LPG fuel into the intake system of the engine, such that the LPG fuel injection path in the injector opens or closes depending on the operational state of the engine. Thus, LPG fuel is prevented from leaking into the intake system of the engine through the injector when the engine is in an ignition OFF state.

What is claimed is:

1. An LPI (liquefied petroleum gas injection) engine system, comprising:
    an injector provided in an intake system of an engine to inject LPG (liquefied petroleum gas) fuel;
    a fuel tank to store the LPG fuel therein to supply the LPG fuel to the injector;
    a supply line and a recovery line connected between the injector and the fuel tank, so that the LPG fuel is supplied and recovered through the supply line and the recovery line;
    an EMS ECU (engine management system electronic control unit) controlling injection time and injection rate of the LPG fuel to be injected through the injector, depending on traveling conditions; and an LPI ECU (liquefied petroleum gas injection electronic control unit) to detect variation in temperature and pressure of the LPG fuel in a fuel supply and recovery system defined between the fuel tank and the injector and to control the fuel supply and recovery system such that supply of the LPG fuel is limited during an emergency state, wherein the EMS ECU receives information about a variety of physical properties, which vary during operation of the engine, from an ATS (air temperature sensor), a MAF (mass air flow) sensor, a TPS (throttle position sensor), a CPS (crank position sensor), a WTS (water temperature sensor), an oxygen sensor and a knock sensor, and the EMS ECU controls an idle speed actuator, provided in the intake system, to adjust an intake rate of air when idling, the LPI ECU receives information about temperature and pressure of the LPG fuel detected by a fuel temperature sensor provided on the supply line and by a fuel pressure sensor provided on the recovery line, the LPI engine system further comprises: a first shutoff valve provided on the supply line to control opening and shutting of a supply path of the LPG fuel; a fuel pump module provided in the fuel tank to supply the LPG fuel; and a second shutoff valve provided on the fuel tank to limit the supply of the LPG fuel from the fuel tank, wherein the first and second shutoff valves and the fuel pump module are operated under the control of the LPI ECU, and the EMS ECU and the LPI ECU are connected to each other through a CAN (controller area network) communication to share information.

2. The LPI engine system as defined in claim 1, wherein the injector comprises:
 a main body mounted to an intake manifold which is the intake system of the engine;
 a passage defined at a predetermined position in the main body such that the passage communicates with the supply line; and
 a nozzle mounted to a lower end of the main body to inject the LPG fuel into the intake manifold,
 wherein the injector further comprises:
 an injection control part controlling injection time and injection rate of the LPG fuel to be injected into the intake system of the engine under the control of the EMS ECU;
 a path shutoff part controlling opening and shutting of an LPG fuel injection path, defined between the injector and the intake system of the engine, depending on an operational state of the engine; and
 a mounting part through which the injector is mounted to the intake system.

3. The LPI engine system as defined in claim 2, wherein the injection control part comprises:
 a first coil provided at an upper position in the main body, the first coil being magnetized by the control of the EMS ECU; and
 a first plunger to be moved depending on the magnetization of the first coil, thus opening or shutting an LPG fuel flow path defined in the injector.

4. The LPI engine system as defined in claim 3, wherein the main body of the injector is divided into an upper body and a lower body based on the first plunger, and the upper body and the lower body are coupled to each other after the injection control part and the path shutoff part are respectively installed in the upper body and the lower body.

5. The LPI engine system as defined in claim 2, wherein the path shutoff part comprises:
 a second coil provided at a lower position in the main body, the second coil being magnetized by the control of the EMS ECU detecting whether the engine is in an ignition ON state or in an ignition OFF state; and
 a second plunger to be moved depending on the magnetization of the second coil, thus opening or shutting the LPG fuel injection path defined through the nozzle.

6. The LPI engine system as defined in claim 2, wherein the nozzle comprises an outer casing made of metal having high heat conductivity.

7. The LPI engine system as defined in claim 6, wherein the outer casing of the nozzle is made of brass.

* * * * *